(12) United States Patent
Kwan et al.

(10) Patent No.: US 6,998,008 B2
(45) Date of Patent: Feb. 14, 2006

(54) METHOD AND APPARATUS FOR ATTACHING AN INK JET FILTER TO AN INK CARTRIDGE

(75) Inventors: Kin Ming Kwan, Lexington, KY (US); David T. Shadwick, Versailles, KY (US); Jeanne M. Saldanha, Lexington, KY (US); Paul T. Spivey, Lexington, KY (US); Jon B. Whitney, Georgetown, KY (US); Julie A. Gordon Whitney, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 266 days.

(21) Appl. No.: 10/619,818

(22) Filed: Jul. 15, 2003

(65) Prior Publication Data

US 2005/0012793 A1    Jan. 20, 2005

(51) Int. Cl.
B32B 3/20    (2006.01)

(52) U.S. Cl. ............... 156/272.8; 156/309.6; 156/290

(58) Field of Classification Search ............ 156/272.2, 156/272.8, 309.6, 290; 219/121.6, 121.63; 347/85, 86, 87, 92, 93
See application file for complete search history.

(56) References Cited

U.S. PATENT DOCUMENTS

| | | | |
|---|---|---|---|
| 4,434,430 A | 2/1984 | Koto | |
| 4,639,748 A | 1/1987 | Drake et al. | |
| 4,882,051 A | 11/1989 | Itoh | |
| 5,049,720 A | 9/1991 | Fang et al. | |
| 5,124,717 A | 6/1992 | Campanelli et al. | |
| 5,154,815 A | 10/1992 | O'Neill | |
| 5,317,339 A | 5/1994 | Braun et al. | |
| 5,489,930 A | 2/1996 | Anderson | |
| 5,502,479 A | 3/1996 | Ishinaga et al. | |
| 5,537,136 A | 7/1996 | Brandon et al. | |
| 5,546,109 A | 8/1996 | Nakano | |
| 5,657,065 A | 8/1997 | Lin | |
| 5,808,644 A | 9/1998 | Imamura et al. | |
| 5,900,898 A | 5/1999 | Shimizu et al. | |
| 5,925,205 A | 7/1999 | Zimmermann et al. | |
| 5,971,531 A | 10/1999 | Dietl et al. | |
| 6,152,560 A | 11/2000 | Hollands | |
| 6,199,979 B1 | 3/2001 | Hobson et al. | |
| 6,254,229 B1 | 7/2001 | Bohorquez et al. | |
| 2002/0191058 A1 | 12/2002 | Anderson et al. | |

(Continued)

FOREIGN PATENT DOCUMENTS

WO    WO 0007254    2/2000

Primary Examiner—John T. Haran
(74) Attorney, Agent, or Firm—Luedeka, Neely & Graham, P.C.

(57) ABSTRACT

An apparatus for a laser transmission welding process for attaching a synthetic filter material to a filter tower frame in an ink jet printer cartridge. The apparatus includes a laser beam source and a filter clamping fixture containing a base, slide rods attached on first ends thereof to the base, an optics support plate attached to second ends of the slide rods, a movable platform for holding an ink cartridge slidably disposed on the slide rods between the base and the optics support plate, a platform moving device for translating the platform to and from a laser welding position, a laser beam transparent plate suspended by support legs from the optics support plate to a position between the movable platform and the optics support plate. The apparatus greatly improves synthetic filter attachment to a filter tower frame in an ink cartridge.

8 Claims, 8 Drawing Sheets

METHOD AND APPARATUS FOR ATTACHING AN INK JET FILTER TO AN INK CARTRIDGE

FIELD OF THE INVENTION

The invention relates to methods for attaching ink jet filters to an ink cartridge for an ink jet printer, and in particular to apparatus for reliable filter attachment to the cartridge.

BACKGROUND

Ink jet printers have achieved wide acceptance in the field of printing and continue to make great strides towards high speed, high quality printing. In order to improve the quality and speed of printing, nozzle plates having a larger number of smaller orifices are provided. As the size of the orifices continue to decrease, components of the ink cartridge assembly become increasingly more important. A component of the ink cartridge that is particularly important for proper operation of an ink jet printhead attached to the cartridge is a filter disposed between an ink reservoir and a flow path for ink to the printhead. The filter is the first and most important line of protection for large or foreign particles entering ink flow features of the printheads. Particles larger than the flow features of the printhead can adversely affect the operation of the printhead thus dramatically decreasing the quality and operation of the printhead.

The most widely used filter material for application in an ink cartridge is a Dutch weave stainless steel material. Metal filters are typically attached to a filter assembly in the ink cartridge by hot stamping the metal filter onto a plastic frame using a hot block or hot die. Melted plastic from the frame is squeezed into the filter mesh to create a mechanical interlock between the frame and the filter. However, the cost of such stainless steel material is relatively high.

In order to reduce the cost of the filter and to provide better wetting of the filter during the melting process, synthetic fiber filter materials have been selected for providing filters. Such synthetic fiber materials include acrylics, nylon, polyester, polyethylene, polypropylene, and polyvinylchloride. However, the replacement of metal filter material with synthetic filter materials, makes attachment of the filter to the frame much more difficult. In a hot stamping process, heat must be transferred from the hot block to the filter material and then to the filter frame. If the melting temperature of the frame is lower than that of the filter material, the frame material will be squeezed into the pores of the filter and create a mechanical lock as before. On the other hand, if the melting temperature of the frame is higher than that of the filter material, the filter will be melted and thinned under pressure, and in some cases the stitches around the perimeter of the filter may be damaged thereby weakening the filter.

Ultrasonics may also be used to attach plastic materials to one another. However, when ultrasonics are applied to synthetic filter materials, the high frequency mechanical vibration may cause loose stitches, broken stitches, and particle generation. Loose stitches and broken stitches may cause the filter to fail prematurely. Particle generation may inhibit the flow of ink to and in the ink jet printheads thereby reducing print quality. Another disadvantage of plastic filter materials is that these materials are generally less stiff than metal filter materials and are thus prone to bending, stretching, and wrinkling during the attachment process.

Thus, there continues to be a need for improved low cost filter materials and improved methods for attaching the filter materials to a frame in an ink cartridge for an ink jet printhead.

SUMMARY OF THE INVENTION

With regard to the foregoing and other objects and advantages, the invention provides an apparatus for a laser transmission welding process for attaching a synthetic filter material to a filter tower frame in an ink jet printer cartridge. The apparatus includes a filter clamping fixture having a base, slide rods attached on first ends thereof to the base, an optics support plate attached to second ends of the slide rods, a movable platform for holding an ink cartridge slidably disposed on the slide rods between the base and the optics support plate, a platform moving device for translating the platform to and from a laser welding position, a laser beam transparent plate suspended by support legs from the optics support plate to a position between the movable platform and the optics support plate, and a laser beam source for heating an interface between the synthetic filter material and the filter tower frame to weld the filter material to the frame.

In another embodiment, the invention provides a method for attaching a synthetic filter material to a filter tower frame in an ink jet printer cartridge. The method includes providing a laser beam source and a filter clamping fixture for laser beam transmission welding of the filter material to the filter tower frame. The clamping fixture includes a base, slide rods attached on first ends thereof to the base, an optics support plate attached to second ends of the slide rods, a movable platform for holding an ink cartridge slidably disposed on the slide rods between the base and the optics support plate, a platform moving device for translating the platform to and from a laser welding position, and a laser beam transparent plate suspended by support legs from the optics support plate to a position between the movable platform and the optics support plate. The ink cartridge having a filter tower frame therein is placed onto the movable platform. The synthetic filter material is positioned onto the filter tower frame in the ink cartridge. The movable platform is moved toward the laser beam transparent plate so that the synthetic filter material is disposed between the transparent plate and the filter tower frame and is in intimate contact with a perimeter of the filter tower frame. The synthetic filter material is then laser welded to the filter tower frame by heating the perimeter of the filter tower frame with a laser beam from the laser beam source having sufficient power to melt a portion of the filter tower frame for melt flow of the portion of the frame through pores in the synthetic filter material.

In yet another embodiment, the invention provides an ink cartridge for an ink jet printer, the cartridge containing a filter tower frame and a polyester filter material attached to perimeter of the filter tower frame using a laser beam transmission welding process. The polyester filter material attached to the frame has a laser beam transmission rate of at least 50% or more for laser beam wavelengths ranging from about 750 to about 1200 nanometers. The filter tower frame has a laser beam absorption rate of greater than about 50% for laser beam wavelengths ranging from about 750 to about 1200 nanometers. At least a portion of the perimeter of the filter tower frame is melt-flowed into pores of the filter material by the laser welding process.

The invention provides a number of advantages over conventional apparatus and methods for attaching filter materials in ink jet cartridges. In particular, the process and apparatus enables use of a synthetic filter material which is less costly than a metal filter material. The apparatus also enables welding of synthetic filter materials to a filter tower structure while maintaining the filter material in a desired shape. For example, contoured or tented filters may be attached to filter towers using the apparatus according to the invention. Another advantage of the invention is that the process of laser welding is substantially a non-contact process thereby avoiding abrasion of the filter material. As compared to ultrasonic welding, the laser welding process according to the invention does not cause vibrations during the welding process which can generate particles or otherwise damage the filter.

BRIEF DESCRIPTION OF THE DRAWINGS

The above and other aspects and advantages of the invention will become further apparent by reference to the following detailed description of preferred embodiments when considered in conjunction with the accompanying drawings in which.

DETAILED DESCRIPTION OF THE PREFERRED EMBODIMENTS

Figure 1:
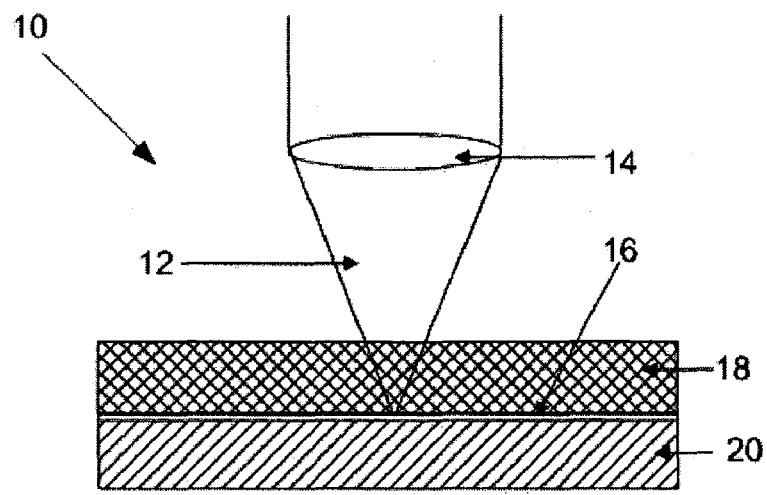
FIG. 1 is schematic representation of a laser transmission welding process according to the invention.

With reference to FIG. 1, a schematic representation of a laser transmission welding process 10 for attaching a synthetic filter to a filter tower structure is shown. According to the process, a laser beam 12 is focused through a lens 14 onto an interface 16 between a first material 18 to be welded to a second material 20. For this process, it is important that at least one of the two materials being joined together be substantially transparent to the laser beam 12.

The material facing the laser source, the first material, may preferably be clear or colored provided the coloring material or pigment does not significantly affect the transmission of the laser beam through the material. The second material is placed on a side of the first material opposite the laser beam side of the first material. The second material must be able to absorb the laser beam 12 so that it heats up and melts during the welding process.

It is also important that the two materials be in intimate contact with each other during the welding process. As the second material absorbs the laser energy and heats up it also heats up the first material in contact with it thereby also melting a portion of the first material in contact with the second material. Hence, the laser beam transmission rate of the first material is an important factor in use of the laser transmission welding process. If the transmission rate is too low, the energy absorbed by the material facing the laser beam 12 may overheat and degrade before the laser energy is transmitted to the second material.

In this case, the first material 18 is preferably a synthetic filter material having a laser beam transmission rate of greater than about 50% at laser beam wavelengths in the near infrared (NIR) spectrum. The second material 20 preferably has a laser beam absorption rate of greater than about 50% at laser beam wavelengths in the NIR spectrum. Particularly preferred wavelengths range from about 750 to about 1200 nanometers. It is also preferred that the melting point of the first material 18 be higher than the melting point of the second material and that the melting point of the first and second materials be no more than 30° C. apart. It is also preferred that the first and second materials 18 and 20 be compatible with each other so that there is intimate mixing of the first and second materials at the interface 16 thereof.

Figure 2:
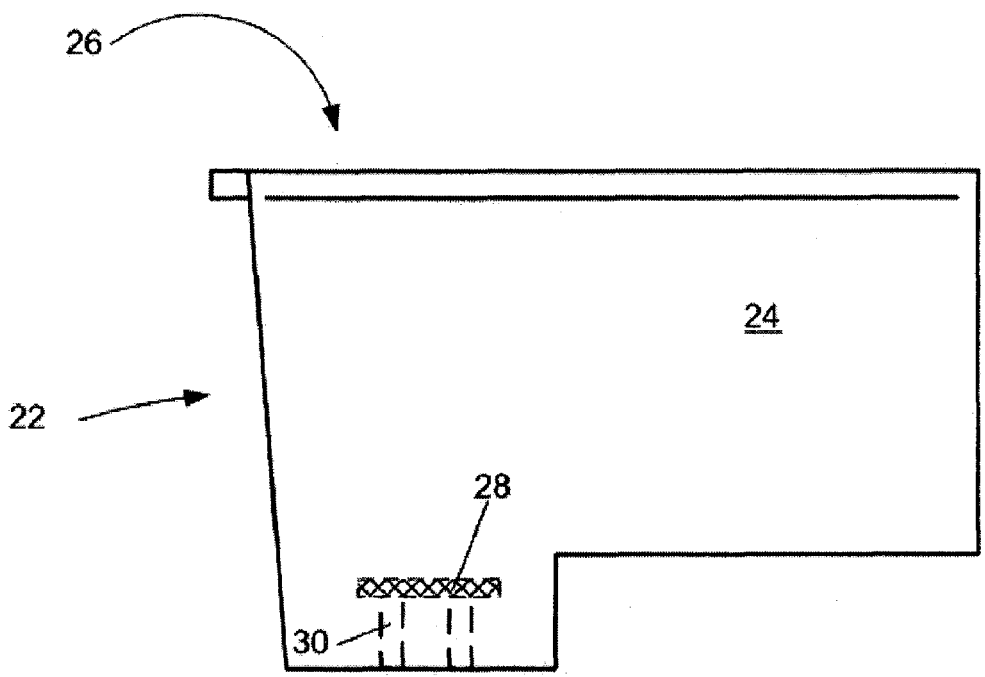
FIG. 2 is side elevational view, not to scale, of an ink cartridge containing a filter welded to a filter tower according to the process of the invention.

With reference to FIG. 2, a simplified drawing of an ink cartridge 22 for an ink jet printer is illustrated. The ink cartridge 22 includes a cartridge body 24 for providing an ink reservoir 26 therein. Disposed in the ink reservoir is an ink filter 28 attached to a filter tower frame 30. A particularly preferred ink cartridge 22 includes a body 24 molded from a material selected from the group consisting of thermoplastic materials including but not limited to polyphenylene oxide/polystyrene alloys, polypropylene, acrylonitrile/butadiene/styrene terpolymers, polystyrene/butadiene alloys or copolymers, polyetherimide, polysulfone, polyesters and the like, having a melting point or softening point above about 120° C. A particularly preferred material for the ink cartridge body is a polyphenylene ether/polystyrene resin from GE Plastics of Pittsfield, Mass. under the trade name NORYL SE1701.

The filter tower frame 30 is preferably made of a material that is chemically compatible with the synthetic filter material and is able to absorb a substantial amount of radiation from a laser source. Particularly preferred materials for providing the filter tower frame 30 include thermoplastic polyester materials such as a glass reinforced polyethylene terephthalate material available E. I. DuPont Company of Wilmington, Del. under the trade name RYNITE FR515. Other preferred materials that may be used for providing the filter tower frame 30 include, but are not limited to, polybutylene terephthalate materials available from GE Plastics of Pittsfield, Mass. under the trade names VALOX 357 and VALOX 855. A laser absorption dye or a pigment such as carbon black is preferably included in the resin for making the filter tower frame 30 in order to increase the absorption of the laser beam radiation so as to melt a portion of the filter tower frame 30 around a perimeter thereof during the welding process. The percentage of pigment dispersed in the material for the filter tower frame 30 may range from about 0.2% to about 2% by weight.

In order to effectively weld the filter 28 to the filter tower frame 30, the filter 28 is preferably made of a woven synthetic thermoplastic material having a substantial laser beam radiation transmission rate at the near infrared spectrum (NIR). Accordingly, it is preferred that the filter material be selected from a polyester material such as a woven polyester available from Saati SpA Corporation of Milano, Italy under the trade name SAATIFIL. It is particularly preferred that the filter material be chemically compatible with the filter tower frame material so that upon melting of a portion of the filter tower frame material, the molten filter tower frame material will wet and the filter material and form a bond with the filter material fibers. The laser beam transmission rate of the filter material is preferably greater than about 50% in at near the NIR spectrum.

Another important aspect of the invention is that there is preferably intimate contact between the filter 28 and the filter tower frame 30 during the laser welding process. Intimate contact between the filter 28 and frame 30 insures that there a solid perimeter around the filter is provided so that ink in the ink reservoir 26 cannot bypass the filter and get into minute flow features in a printhead attached to the ink cartridge 22. Intimate contact is preferably obtained by use of a laser transmission welding fixture 32 generally as shown in FIG. 3.

Figure 3:
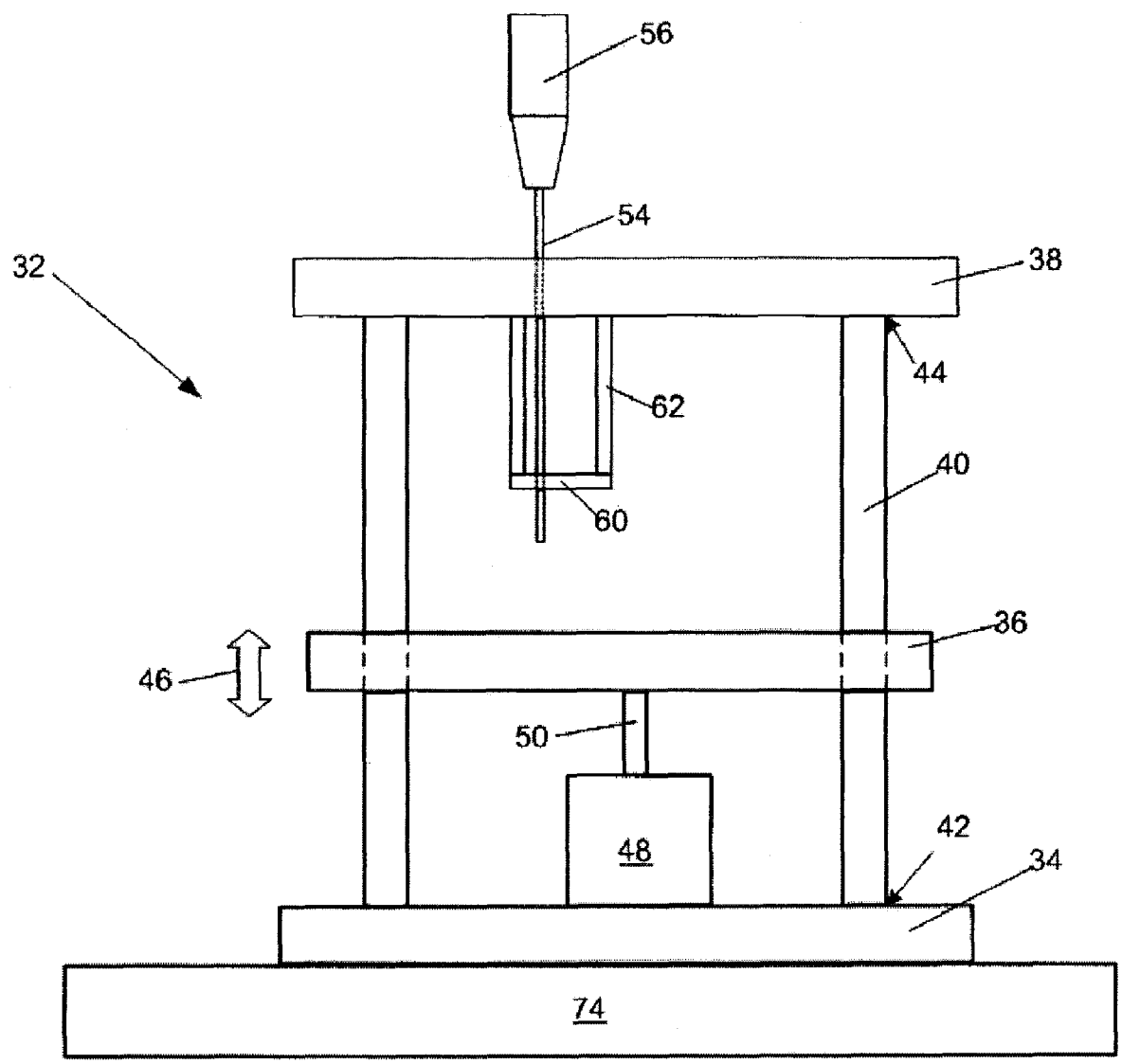
FIG. 3 is a side elevational view, not to scale, of a laser transmission welding fixture for use in the process of laser transmission welding according to the invention.

With reference to FIG. 3, the laser transmission welding fixture 32 includes a base plate 34, a moving plate 36, and a top plate 38. The top plate 36 and base plate 32 are connected to one another by slide rods 40 so that the base plate 32 is attached on a first end 42 of the slide rods 40 and the top plate 36 is attached on a second end 44 of the slide rods 40. The movable plate 36 is movably positionable between the top plate 38 and the base plate 34 by, for example, an electric or hydraulic cylinder 48 and push rod 50. Accordingly, the movable plate 36 is freely slidable in the direction of arrow 46 along a portion of the length of the slide rods 40.

Figure 4:
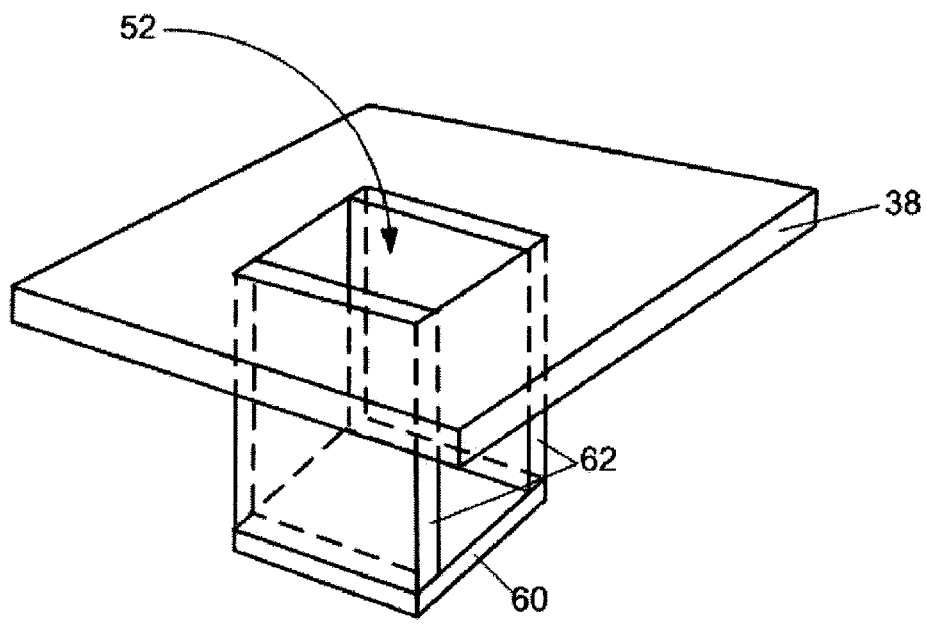
FIG. 4 is a partial perspective view, not to scale, of an upper portion of a laser transmission welding fixture according to the invention.

The upper plate 38 includes an opening 52 therein (FIG. 4) for transmission of a laser beam 54 from a laser source 56 to a workpiece placed on movable plate 36. A preferred laser beam source 56 is a diode laser having a wavelength ranging from about 750 to about 1200 nanometers. An Nd:YAG laser may also be used to provide the laser beam source 56. A laser beam transparent plate 60 is attached to support legs 62 which are attached to the top plate 38 so that the transparent plate 60 is fixedly suspended between the top plate 38 and the movable plate 36. The support legs 62 enable the transparent plate 60 to resiliently contact a surface of the workpiece as described in more detail below.

Figure 5:
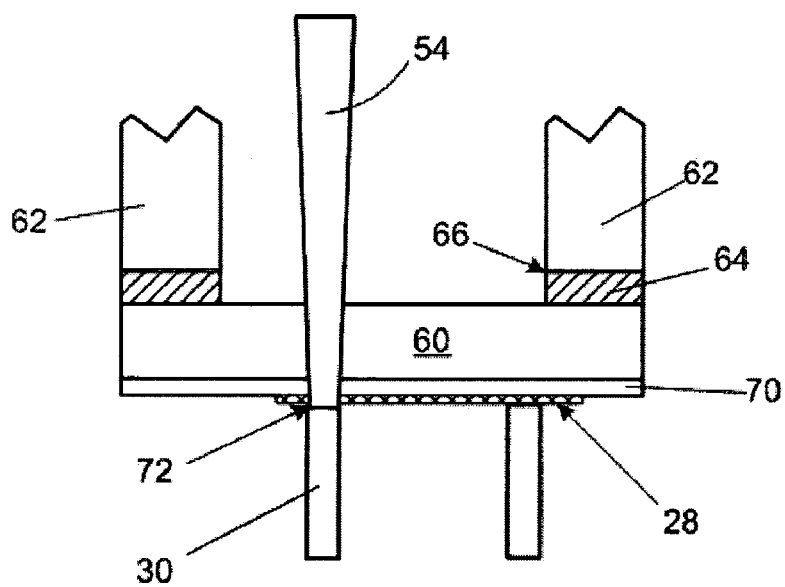
FIG. 5 is a detailed view, not to scale, of a transparent plate and support legs for a laser transmission welding fixture according to the invention.

A more detailed view of the transparent plate 60 and support legs 62 is shown in FIG. 5. The transparent plate 60 may be provided by glass, clear polycarbonate, clear polymethyl methacrylate cyclic olefin polymer, or quartz. A particularly preferred material for the transparent plate is glass. The transparent plate 60 preferably has a thickness ranging from about 8 to about 12 millimeters for glass and from about 18 to about 25 millimeters for polymeric or plastic materials.

The transparent plate 60 is attached to the support legs 62 with a resilient pad 64 interposed between an end 66 of legs 62 and the transparent plate 60. The resilient pad 64 may be made of natural or synthetic rubbers such as neoprene rubber or a thermoplastic elastomer available from Advanced Elastomer Systems of Akron, Ohio under the trade name SANTOPRENE.

Use of a resilient pad 64 between the legs 62 and transparent plate 60 is important to maintain the plate 60 in intimate contact with the workpiece such as filter 28 on filter tower frame 30 as pressure is applied to the filter 28 and filter tower frame 30 during the welding process. As with all molded plastic parts, there is some variation in the height or planarity of the perimeter of the filter tower frame 30. The resilient pad 64 enables full surface contact between the filter 28 and the transparent plate 60 regardless of variations in the height or planarity of the filter tower frame 30. During the welding process, the transparent plate 60 is pressed against the filter 28 and filter tower frame 30 with a pressure ranging from about 1500 to about 3000 mm Hg.

An opposite surface of the transparent plate 60 is preferably coated with a release coating material 70 such as silicone, siloxane, parylene, or fluoropolymer coating materials. A particularly preferred coating material is a fluoropolymer coating material available from the E. I. DuPont Company under the trade name TEFLON. The release coating material 70 is preferably substantially transparent to laser beam radiation in the near infrared spectrum, most preferably having a laser beam transmission rate of at least about 80% at wavelengths ranging from about 750 to about 1200 nanometers.

During the laser transmission welding process, the perimeter 72 of the filter tower frame 30 is heated to the melting point of the frame material. As a portion of the frame 30 melts, it flows through pores in the filter 28 and adheres to the coating material 70 on the transparent plate 60. If the filter tower material is not removed from the transparent plate 60, it will absorb laser energy from the laser beam 54 and may burn or crack the transparent plate 60. Filter tower material stuck to the transparent plate 60 may also stick to and cause separation between a filter 28 and filter tower 30 on the next welding cycle. Accordingly, the coating material 70 serves to protect the integrity of the welded structures and to prevent damage to the welding fixture 32.

The entire fixture 32 is preferably positioned atop an XY translation table 74 for moving the fixture 32 under the laser beam 54 during the welding process. By moving the fixture 32 and workpiece on the fixture 32, a stationary laser beam source 56 may be used to perform the welding operation.

Figure 6A:
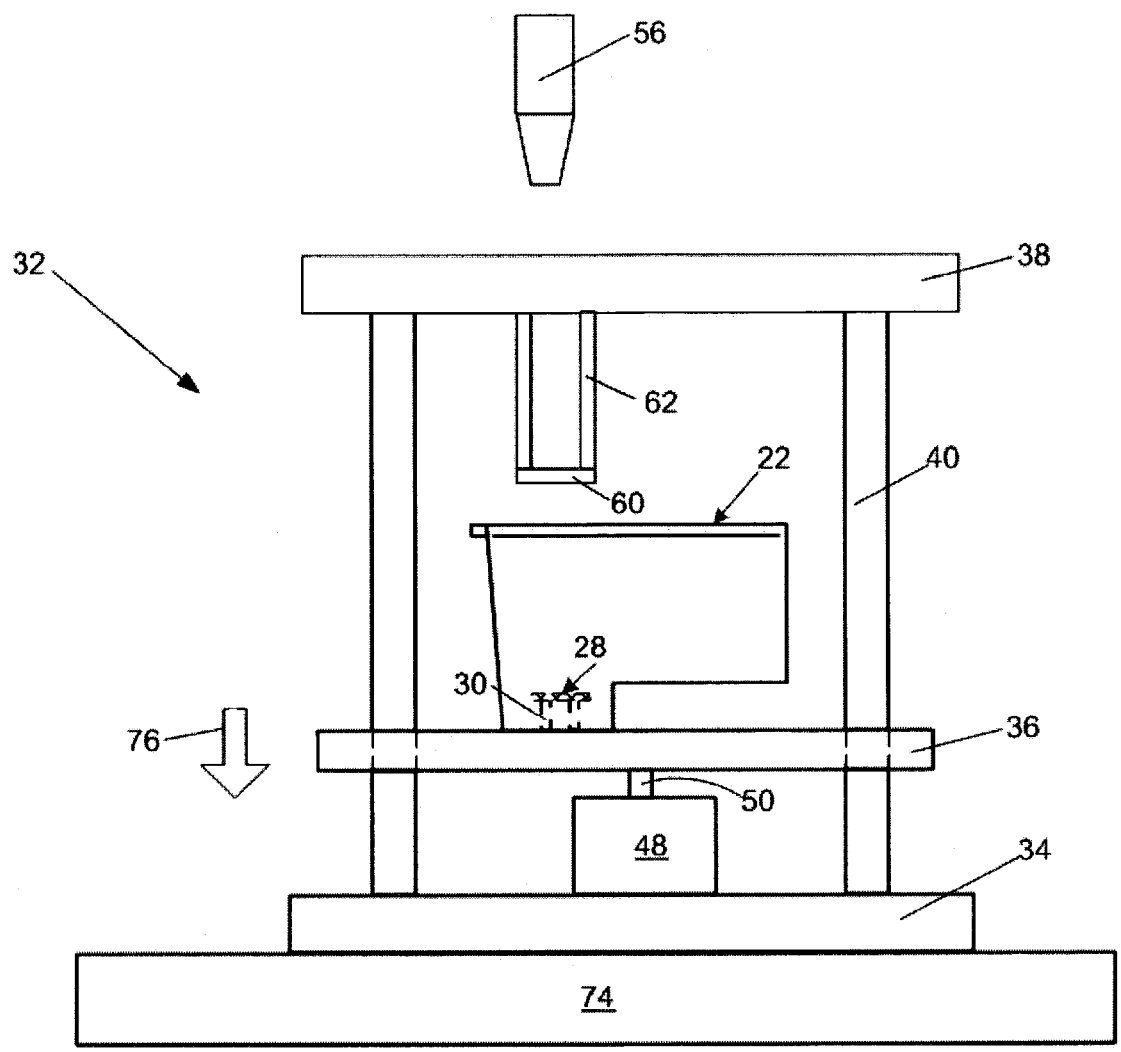
FIGS. 6A and 6B are side elevational view of a fixture according to the invention during a laser transmission welding process.
Figure 6B:
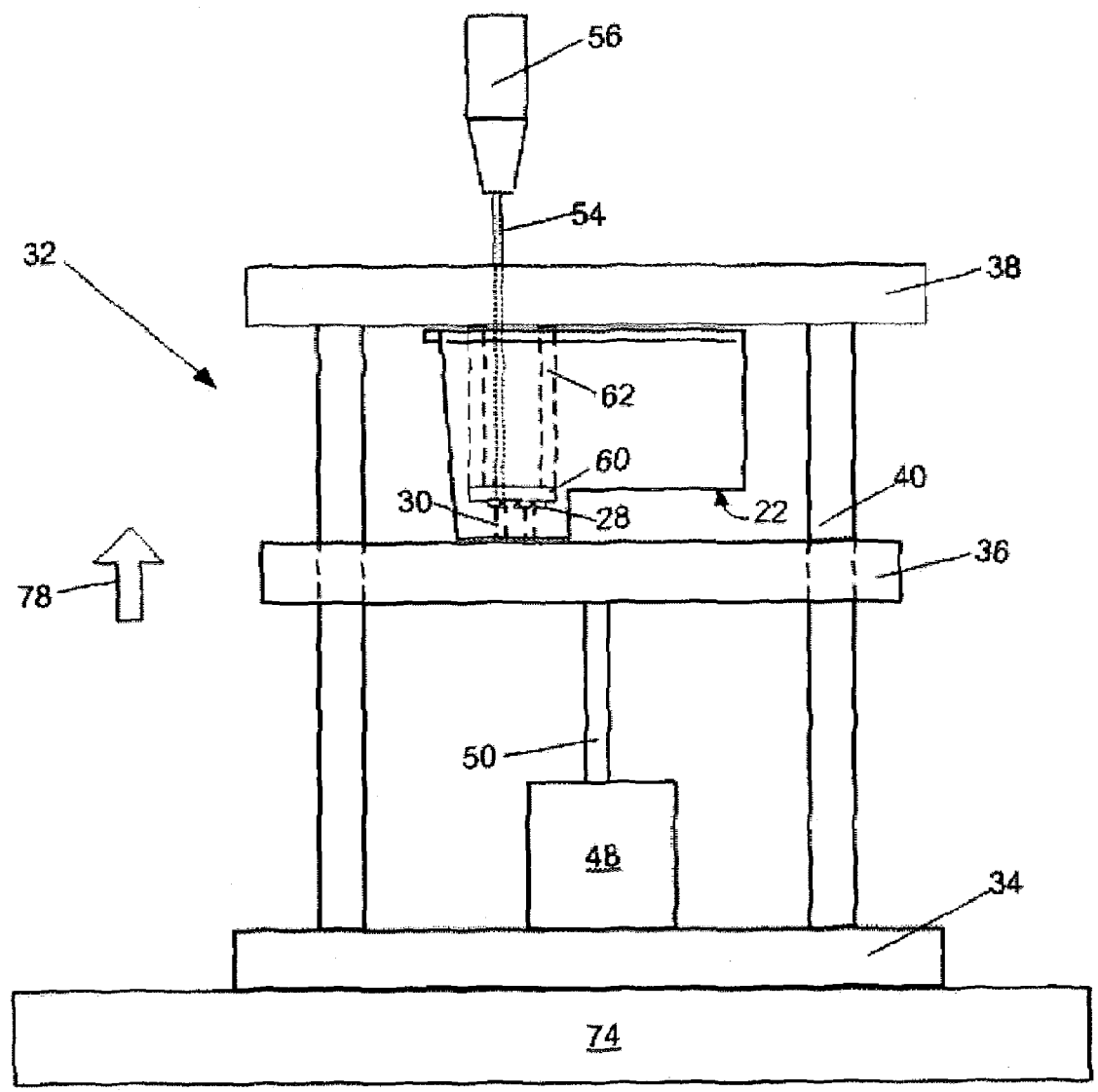

A process for laser transmission welding of the filter 28 to the filter tower frame 30 is illustrated schematically in FIGS. 6A and 6B. After completion of a welding procedure, the movable plate 36 is lowered by cylinder 48 and piston 50 to a first position indicated by arrow 76. An ink cartridge 22 is placed in the welding position on movable plate 36 so that the filter tower 30 and filter 28 align generally with the position of the transparent plate 60. During this step, the laser beam from the laser source 56 is not turned on.

Next, cylinder 48 is activated to extend piston 50 therefrom and move movable plate 36 to a second position indicated by arrow 78 wherein the transparent plate 60 is in intimate contact with the filter 28 inside the ink cartridge 22. The laser source 56 is activated to provide laser beam 54 for welding the filter 28 to the filter tower frame 30 while the XY table moves the entire fixture 32 in the X and Y directions so that a weld can be provided around the perimeter of the filter tower frame 30. Upon completion of the welding process, the movable plate 36 is again lowered to the first position indicated by arrow 76 (FIG. 6A) for removal of the ink cartridge 22 from the fixture 22.

Figure 7:
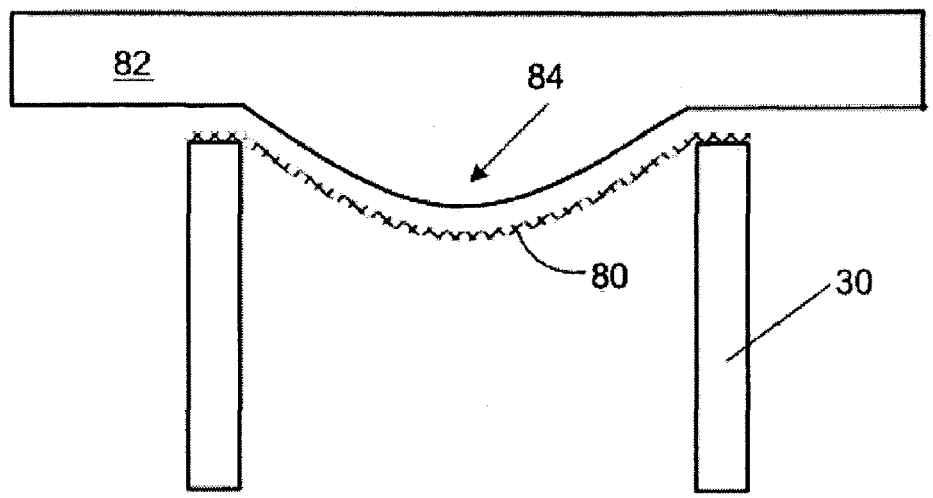
FIG. 7 is a detailed side view of an alternate filter shape and an alternate transparent plate for use with a laser transmission welding fixture according to the invention.
Figure 8:
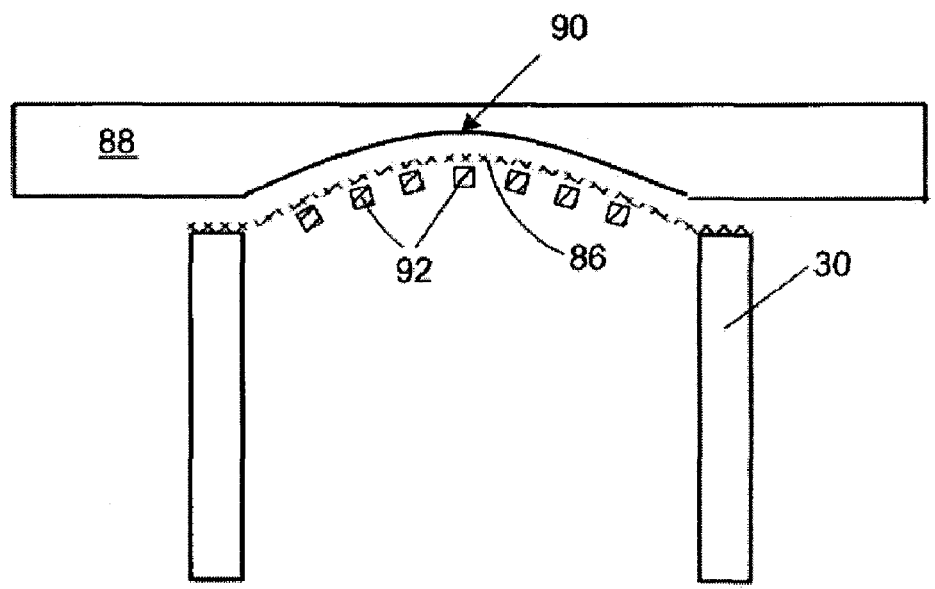
FIG. 8 is a detailed side view of another alternate filter shape and another alternate transparent plate for use with a laser transmission welding fixture according to the invention.
Figure 9:
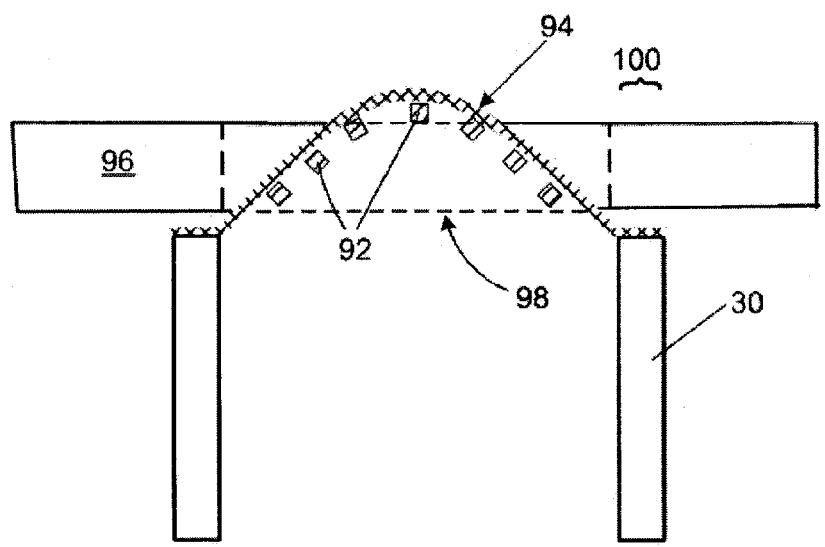
FIG. 9 is a detailed side view, not to scale, of a transparent plate for use in welding a filter to a filter tower frame according to another embodiment of the invention.

The invention is also adaptable to contoured or shaped filter elements 80 as shown in FIGS. 7–9. With reference to FIG. 7, the filter 80 has a concave shape extending down into the filter tower 30. In order to weld the filter 80 to the filter tower frame 30, a transparent plate 82 having a convex portion 84 is used in the fixture 32 of the invention.

In FIG. 8, filter 86 has a convex shape. Accordingly, transparent plate 88, in this case, has a concave shape 90 as shown. Supports 92 may be provided in the filter tower 30 to support the shape of the filters 80 and 86.

Figure 10:
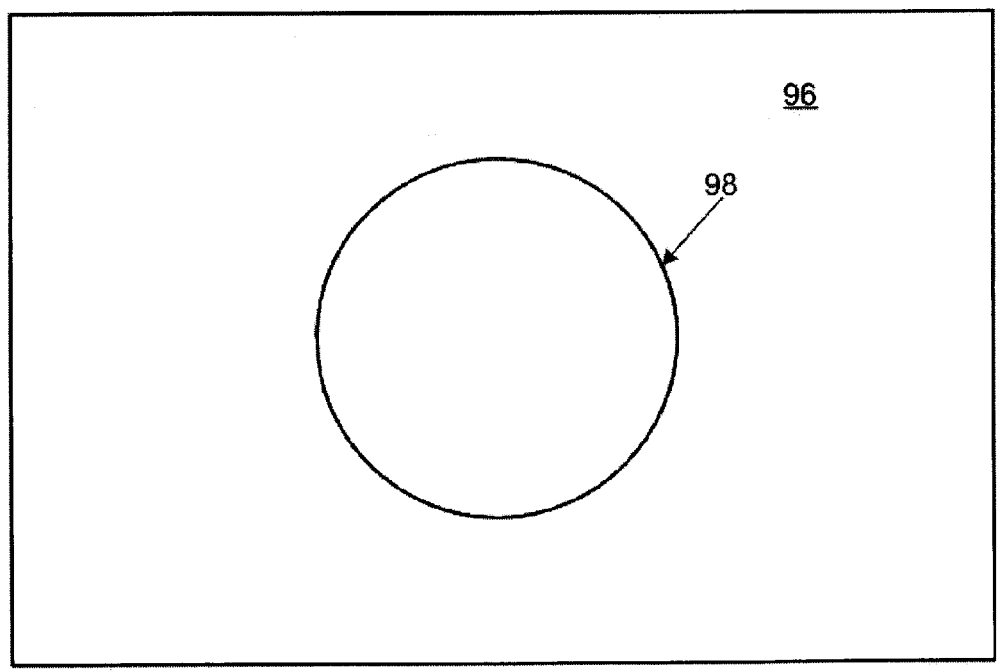
FIG. 10 is a plan view, not to scale, of the transparent plate of FIG. 9.

The invention is also adaptable to filters 94 having a complex shape by providing a transparent plate 96 as shown in FIGS. 9 and 10 having an opening 98 therein. A round opening 98 is shown in FIG. 10, however any shape opening may be provided in the plate 96 provided there is a portion of the plate such as portion 100 that may be used to apply pressure to the filter 94 and filter tower frame 30 around the periphery of the frame 30.

Figure 11:
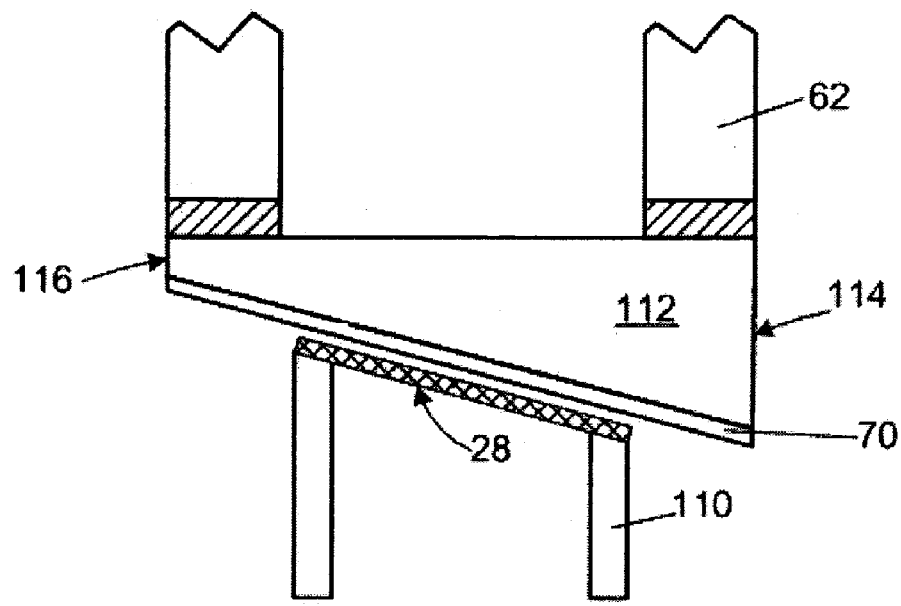
FIGS. 11 and 12 are plan views, not to scale, of transparent plates and support legs for laser welding a filter to an angled filter tower frame according to the invention.
Figure 12:
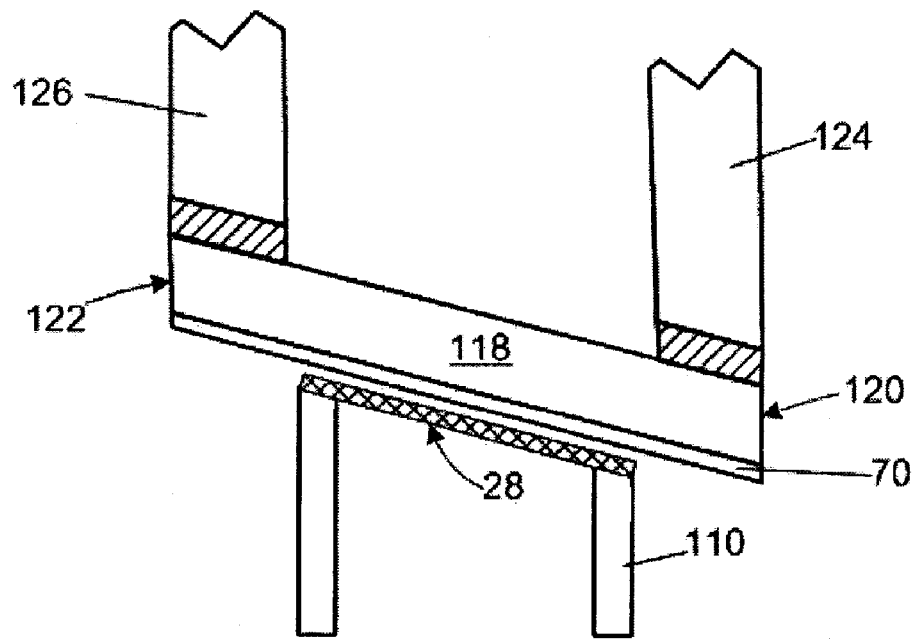

FIGS. 11 and 12 illustrate variations on the transparent plate and support legs that enable attaching a filter on an angle to an angled filter tower frame 110. In FIG. 11, the support legs 62 have substantially the same length. However, a transparent plate 112 thereof is thicker on end 114 compared to end 116 thereof. This enables the transparent plate 112 to apply substantially the same pressure around the entire periphery of the filter 28 and the filter tower frame 110 around the entire periphery of the filter tower frame during the welding process.

In FIG. 12, a transparent plate 118 has the same thickness from end 120 to end 122. However, support leg 124 is made longer than support leg 126 to enable the transparent plate to apply substantially the same pressure to the filter 28 and to the filter tower frame 110 around the entire periphery of the filter tower frame 110 during the welding process.

The apparatus of the invention as described above may also be adaptable to other laser welding techniques. Such techniques include, but are not limited to, contour laser welding, mask laser welding, quasi-simultaneous laser welding and the like.

Contour laser welding uses a laser light source and moves the part under the laser beam or moves the laser beam over the part, typically using an X,Y table. The laser beam typically travels around the weld area once or only a few times to complete the welding process.

Mask laser welding uses a laser light source that irradiates a linear section at a time. The mask is placed between the laser light source and the part to be welded. Then the laser beam or the part and mask combination are moved to sweep the laser beam across the mask and through the mask to the part being welded. Quasi-simultaneous laser welding uses a laser beam reflected off of movable mirrors such as those on a galvanometer head. The mirrors typically move very fast causing the laser beam to scan around the surface of the part to be welded at a rate of about 1 to about 10 meters/sec. This method heats the welding surface by quickly scanning an intense laser beam around the area to be welded. Accordingly, the laser beam scans around the part many times, from a few to thousands of passes, during the welding process. In yet another embodiment, simultaneous welding may also be used with the apparatus of the present invention. Simultaneous laser welding irradiates all of the weld area at the same time. Diode laser stacks can be placed directly above the weld area. Alternatively a diode laser, Nd:YAG laser, or some other laser can be used with optical fibers or some other light transmission media to direct the laser beam to the weld area.

The foregoing description of certain exemplary embodiments of the present invention has been provided for purposes of illustration only, and it is understood that numerous modifications, alterations, substitutions, or changes may be made in and to the illustrated embodiments without departing from the spirit and scope of the invention.

What is claimed is:

1. A method for attaching a synthetic filter material to a filter tower frame in an ink jet printer cartridge, comprising:
   providing laser beam source and a filter clamping fixture for laser beam transmission welding of the filter material to the filter tower frame, the clamping fixture including a base, slide rods attached on first ends thereof to the base, an optics support plate attached to second ends of the slide rods, a movable platform for holding an ink cartridge slidably disposed on the slide rods between the base and the optics support plate, a platform moving device for translating the platform to and from a laser welding position, and a laser beam transparent plate suspended by support legs from the optics support plate to a position between the movable platform and the optics support plate,
   placing an ink cartridge onto the movable platform, the ink cartridge having the filter tower frame therein;
   positioning the synthetic filter material onto the filter tower frame in the ink cartridge;
   moving the movable platform toward the laser beam transparent plate so that the synthetic filter material is disposed between the transparent plate and the filter tower frame and is in intimate contact with a perimeter of the filter tower frame; and
   laser welding the synthetic filter material to the filter tower frame by heating the perimeter of the filter tower frame with a laser beam from the laser beam source having sufficient power to melt a portion of the filter tower frame for melt flow of the portion of the frame through pores in the synthetic filter material.

2. The method of claim 1 wherein the laser beam source is fixed and the filter clamping fixture is moved by an XY translation table during the laser welding process.

3. The method of claim 1 wherein laser welding is conducted at a wavelength ranging from about 750 to about 1200 namometers.

4. The method of claim 1 wherein the laser beam source provides a narrow weld having a width ranging from about 0.4 to about 0.8 millimeters at a welding speed ranging from about 20 to about 40 millimeters per second.

5. A method for attaching a synthetic filter to a polymeric filter tower frame wherein the filter and filter tower frame have melting points no more than about 30° C. apart and wherein the filter is substantially laser beam transparent and the filter tower frame is substantially laser beam absorbent, the method comprising the sequential steps of placing the filter on the filter tower frame, pressing the filter to the filter tower frame with a pressure ranging from about 1500 to about 3000 mm Hg using a laser beam transparent plate in contact with the filter, and laser welding the filter to the filter tower frame around the periphery of the filter tower frame using a near infrared spectrum laser beam having a wavelength ranging from about 750 to about 1200 nanometers while maintaining pressure on the filter and filter tower frame with the laser beam transparent plate.

6. The method of claim 5 wherein the laser beam transparent plate contains a non-stick coating on a surface thereof for contact with the filter.

7. The method of claim 5 wherein the filter is welded to the filter tower frame with a narrow weld having a width ranging from about 0.4 to about 0.8 millimeters at a welding speed ranging from about 20 to about 40 millimeters per second.

8. The method of claim 5 wherein the laser welding step is selected from the group consisting of contour laser welding, mask laser welding, quasi-simultaneous laser welding.

* * * * *